United States Patent
De Haan et al.

(10) Patent No.: US 6,701,064 B1
(45) Date of Patent: Mar. 2, 2004

(54) RECORD CARRIER, AND APPARATUS AND METHOD FOR PLAYING BACK A RECORD CARRIER, AND METHOD OF MANUFACTURING A RECORD CARRIER

(75) Inventors: Wiebe De Haan, Eindhoven (NL); Kazuhiro Suzuki, Tokyo (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/455,129

(22) Filed: Dec. 6, 1999

(30) Foreign Application Priority Data

Dec. 14, 1998 (EP) .............................. 98204238

(51) Int. Cl.$^7$ ................................. H04N 5/91
(52) U.S. Cl. .................... 386/95; 386/125; 345/788
(58) Field of Search ................... 386/1, 45, 46, 386/95 M, 125 C, 126; 345/156, 169, 173, 179, 788

(56) References Cited

U.S. PATENT DOCUMENTS

| | | | |
|---|---|---|---|
| 5,260,697 A | * 11/1993 | Barrett et al. ............... 345/173 |
| 5,848,217 A | * 12/1998 | Tsukagoshi et al. .......... 386/95 |
| 6,057,842 A | * 5/2000 | Knowlton et al. .......... 345/788 |
| 6,353,427 B1 | * 3/2002 | Rosenberg .................. 345/156 |
| 6,396,480 B1 | * 5/2002 | Schindler et al. .......... 345/169 |

\* cited by examiner

Primary Examiner—Thai Tran
Assistant Examiner—Christopher Onuaku
(74) Attorney, Agent, or Firm—Michael E. Belk (57) ABSTRACT

A record carrier includes a first stream of data representing a video item, a second stream of data representing a graphics item, and a control program for controlling interactive playback of the items. The program has a first and a second program portion. The first program portion includes primary data, relating to shape properties of a graphics object. The second program portion is to be executed after the first program portion when user input complies with a predetermined condition specified in the program. The second program portion specifies a visual feedback in response to the user input and includes secondary data, relating to at least an additional visual property of the graphics object.

25 Claims, 4 Drawing Sheets

RECORD CARRIER, AND APPARATUS AND METHOD FOR PLAYING BACK A RECORD CARRIER, AND METHOD OF MANUFACTURING A RECORD CARRIER

FIELD OF THE INVENTION

The invention relates to multimedia presentations in which graphics objects are presented interactively over a video background.

BACKGROUND OF THE INVENTION

The invention relates to an apparatus for playing back a record carrier on which are recorded at least a first stream of data representing a video item, a second stream of data representing a graphics item, and a control program for controlling interactive playback of said items, said apparatus comprising, means for selecting a stream of data to be read from the record carrier, which means are controlled by the control program, reading means for reading the control program and the selected stream from the record carrier, video generating means for generating a pixel based representation of the video item in the first stream, graphics generating means for generating a pixel based representation of the graphics item in the second stream, input means for receiving user input, which apparatus is adapted for executing a first program portion of the control program which comprises at least primary data relating to shape properties of a graphics object, for executing a test for compliance of user input with a condition specified in the control program and for executing a second program portion of the control program for giving visual feedback in response to the user input, The invention further relates to a method for playing back a record carrier, said method comprising the following steps, reading a control program having a first and second program portion from the record carrier, executing the first program portion comprising primary data relating to shape properties of a graphics object, requesting user input, performing a test comprised in said program for compliance of said user input with a condition, upon compliance of the user input with said condition executing the second program portion for giving visual feedback to the user input, selecting a stream of data representing a video item and/or a graphics item, the selection being dependent on the user input, reading said stream from the record carrier and generating a pixel based representation from the item in said stream.

The invention further relates to a record carrier on which is recorded at least a first stream of data representing a video item, a second stream of data representing a graphics item, a control program for controlling interactive playback of said items, which program has a first program portion which comprises primary data relating to shape properties of a graphics object and a second program portion which is to be executed after the first program portion in case of compliance of user input with a predetermined condition specified in the program, which second program portion specifies a visual feedback in response to the user input.

The invention also relates to a method of manufacturing a record carrier according to which method a first stream of data representing a video item is stored at the record carrier, a second stream of data representing a graphics item is stored at the record carrier, a control program for controlling interactive playback of said items is stored at the record carrier, which program has a first program portion which comprises primary data, relating to shape properties of a graphics object and a second program portion which is to be executed after the first program portion in case of compliance of user input with a predetermined condition specified in the program, which second program portion specifies a visual feedback in response to the user input, characterised in that the second program portion comprises secondary data, relating to at least an additional visual property of the graphics object.

The SVCD standard as layed down in the working draft SC100B/NP177/PTD-003 specifies an apparatus for playback of play items, a play item being an audio, and/or a video and/or a graphics item. If so desired a graphics item can be reproduced synchronously with a video item, e.g. in the form of subtitling accompanying a video item. A pixel based representation is to be interpreted as a representation in the form of a two-dimensional array of picture elements. According to the SVCD standard the apparatus is to comprise means for controlling interactive playback of the items at the record carrier by means of a play back control program. This program comprises structures denoted as "play list" and "selection list". The former structure specifies a sequence of play items to be played sequentially. The latter structure enables a user to choose which play items are to be reproduced and in which order. The selection list contains amongst others a reference to a play item. The latter is for example a graphics item which comprises a graphics object representing a menu having different menu parts which correspond to play items at the record carrier which are available to the user. The menu parts for example are in the form of a short description of the corresponding play item or a logo representing the available play item. The shape properties of a graphics object are defined as properties necessary to reconstruct the shape of the graphics object in the pixel based representation. In the SVCD standard the shape properties are defined in the structure "display data" in the form of runlength encoded data. The reference in the selection list is primary data relating to the shape properties in that it refers to the graphics item comprising the display data. The selection list in addition contains references to play items from which the user can make a choice (available play items) and assigns a rectangular region to each of the available play items. By pointing at a rectangular region, the user can focus on an available play item. That available play item can subsequently be activated by the user, for example by pushing a button. By focussing on or activating an available play item the menu part within the corresponding rectangular region is highlighted as a visual feedback upon the user input. Highlighting of the rectangular region is realised by means of a color lookup table. In the rectangular region corresponding to the play item which is focussed upon or activated the color lookup table is loaded with color values differing from those outside the rectangular region. This has the disadvantage that a menu part can only be highlighted individually if that menu part has a rectangular region which does not contain another menu part. This restricts the feedback capabilities of the known apparatus.

The above references are hereby incorporated herein in whole by reference.

SUMMARY OF THE INVENTION

It is a purpose of the invention to provide means which enable an improved feedback upon user input.

According to this purpose the apparatus is characterized in that, the second program portion of the control program comprises secondary data which relates to an additional visual property of the graphics object, the apparatus being adapted for generating the visual feedback by reproducing a pixel based representation of the graphics object on the basis of the primary data and the secondary data.

According to this purpose the method for playing back is characterised in that the second program portion comprises secondary data relating to at least one additional visual property of the graphics object and in that the visual feedback is a representation of the graphics object on the basis of the primary and the secondary data.

According to this purpose the record carrier of the invention is characterised in that the second program portion comprises secondary data, relating to at least an additional visual property of the graphics object.

According to this purpose the method for manufacturing a record carrier is characterised in that the second program portion comprises secondary data relating to at least an additional visual property of the graphics object. The measures of the invention enable an improved response to user input.

According to these measures execution of the second program portion of the control program has the effect that an additional visual property to which the secondary data is related is assigned to the graphics object, the shape properties of which were assigned in the first program portion.

An attractive embodiment is characterised in that the graphics object comprises two or more parts, for example menu parts, having mutually different color codes and in that the secondary data relates to at least one color vale which is to be assigned to a color code. By assigning a color value to a part of a graphics object, instead of assigning the color to a region it is possible to individually highlight that part even in the case that no region exists which exclusively contains said part.

In practice some tens of available play items may be available at the record carrier. In an attractive embodiment the color code is represented by at least 6 bits. This enables the apparatus to separately highlight an object part corresponding to each of the available play items.

Another additional visual property is for example visibility. This property may be used to selectively display one of a set of object parts. The set of object parts is for example a set of arrows which each point to a further set of object parts which each symbolize an available play item. Again another additional visual property of a graphics object which can be assigned is for example the location at which it is to be displayed. A further additional visual property of a graphics object is its orientation. The graphics object in the latter two cases is for example an arrow which is overlayed on a video image. Visual feedback is given by having the arrow point to an object within the video image.

Preferably the primary data is related to the shape properties in that the primary data is a reference to a data structure comprising shape data representing the shape properties. This has the advantage that the control program can be relatively small, so that it can be easily resided in an internal memory of the apparatus for playing back. Otherwise the control program may comprise the shape data. In both cases the feedback to user input is not retarded by loading the shape data, because loading has already taken place before the user input is requested.

Preferably the datastructure comprises further data, the secondary data being related to the additional visual property in that the secondary data comprises modification data which includes a reference indicating the location of said further data within the datastructure, the modification data and the further data representing the additional visual property. This has the advantage that the modification data and therewith the control program can be compact. Said datastructure comprising the shape data and the further data can already be loaded in a memory of the apparatus before the user input is requested so that the process of loading the further data does not retard the visual feedback.

The control program may comprise a plurality of first and second program portions for example to present a nested structure of menus to the user. As the datastructures are not included in the program, but referred to by the primary data only that datastructure which is relevant to the current request for user input need be present in the memory, so that the amount of memory required is limited.

It is particularly advantageous if the further data comprises one or more color values. A relatively large set of color values may be required to enable visual feedback in practical cases. By this measure it is achieved that the set of color values need not be incorporated in the control program. The modification data included in the program is for example in the form of a command comprising the reference which instructs a play back apparatus to load one or more color values into a color lookup table starting from a location in memory indicated by the reference.

In an advantageous embodiment of the record carrier the data comprised in the second stream and the data related to the graphics object are in a form which can be processed by common graphics generating means. This has the advantage that an apparatus can be used in which the graphics generating means not only generate a pixel based representation of the graphics item in the second stream, but also generate the pixel based representation of the graphics object.

The apparatus preferably is adapted for executing timing commands in the control program. This has the advantage that the visual feedback can be given in a dynamic form. A dynamic visual feedback provides an efficient way to alert the user.

An attractive embodiment of the apparatus is characterised in that the graphics generating means comprise graphics decoding means for generating an intermediate pixel based representation, storage means for storing the intermediary pixel based representation and graphics modification means for generating a pixel based representation from the intermediary pixel based representation on the basis of the modification data. This embodiment makes it possible to store the intermediary pixel based representation of the graphics object before user input is requested and to compute a pixel based representation from that intermediary pixel based representation after the user input is received. Therewith, the response time between user input and visual feedback is further shortened. Several possibilities exist for representing the shape of the graphics objects. The shape date may for example be in the form of a set of codes which indicate for each of a set of pixels whether it is a background pixel or whether it is an object pixel. In case that the object contains more than one part the code may indicate to which part the pixel belongs. The shape data may for otherwise be in a compressed form, for example in the form of a contour based coding, for example a coding of parts in the object in the form of a list of lines bounding the object. In another embodiment the object parts are encoded in the form of a block code, wherein the shape of the object part is encoded in the form of a plurality of blocks of decreasing size. In a preferred embodiment the shape data is compressed in the form of a run length code. This has the advantage that the intermediary pixel based representation can be generated with relatively simple hardware while a considerable data reduction is achieved.

It is noted that the first and the second streams are not necessarily separate from each other. They may be multiplexed in a common stream. Multiplexing the video and the graphics stream is very useful if a video item and a graphics item (for example subtitling) are to be reproduced synchronously with each other.

In an embodiment the apparatus of the invention has digital outputs for providing a first, a second and a third image signal which respectively represent the pixel based representation of the video item, the pixel based representation of the graphics item and the pixel based representation of the graphics object to a display device. A third image signal is superfluous in an embodiment of the apparatus wherein the graphics generating means both generate the pixel based representation of the graphics item and the pixel based representation of the graphics object.

The display device referred to in the previous paragraph may on its turn have combination means for generating a resulting pixel based representation from said image signals, and a video generator for generating a video signal from said resulting pixel based representation. Otherwise the display device may have a video generator for generating an elementary video signal from each of the incoming image signals and combination means for generating a resulting video signal from the elementary video signals. The combination means may for example superpose the image/video signals, or temporarily select one of the image/video signals or locally select one of the image/video signals. The modification data of a graphics object may contain data relating to a setting of the combination means.

Such a display device may be integrated with the apparatus of the invention.

These and other aspects are elucidated in more detail with reference to the drawings. Therein:

BRIEF DESCRIPTION OF THE DRAWING

FIG. 5 schematically shows an embodiment of an apparatus according to the

DETAILED DESCRIPTION OF THE PREFERRED EMBODIMENT

Figure 1:
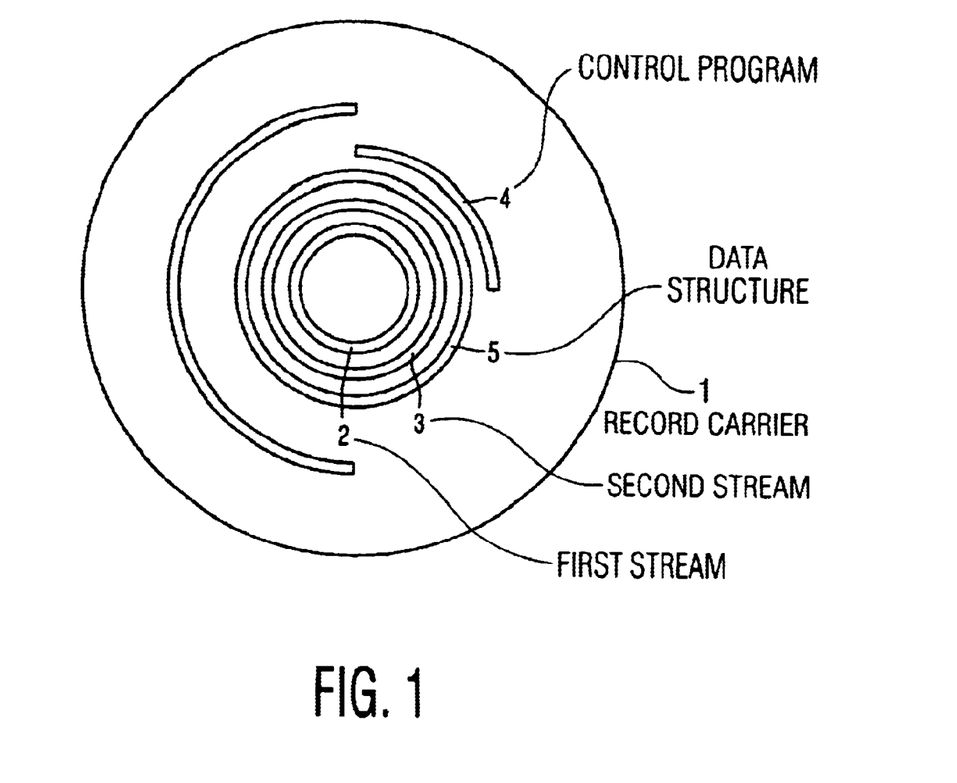
FIG. 1 schematically shows a record carrier according to the invention.

FIG. 1 schematically shows a record carrier 1 according to the invention. On the record carrier is recorded at least a first stream 2 of data representing a video item. The video item is preferably encoded in MPEG format. The record carrier comprises a second stream 3 of data representing a graphics item. The second stream 3 is in the form of a sequence of graphics pages. Said pages comprise shape data representing shape properties of at least one graphics object and modification data representing additional visual properties of said graphics object.

In the present example the second stream 3 is separate from the first stream 2. Otherwise the first and the second stream can be multiplexed. For example the first stream is encoded as an MPEG2 transport stream and the second stream is accomodated in the form of a private data stream in the MPEG2 transport stream.

In a preferred embodiment a graphics page comprises in addition to the shape data and the modification data a header and color lookup table data, also denoted as clut data. The contents of a graphics page are indicated in more detail in Table 1. Therein, these four categories of data are indicated by capitals.

TABLE 1

Syntax of a graphics page

| Syntax | No. of bits |
|---|---|
| HEADER | |
| page_start_code | 16 |
| reserved1 | 8 |
| page_data_length | 24 |
| duration | 32 |
| reserve2 | 8 |
| COLOR LOOKUP TABLE DATA | |
| clut_data_length | 24 |
| for (i=0; 4*i <clut_data_length ; i++) { | |
|   clut_element_Y | 8 |
|   clut_element_Cr | 8 |
|   clut_element_Cb | 8 |
|   stuffing_byte | 8 |
| } | |
| SHAPE DATA | |
| number_of_objects | 8 |
| total_object_data_length | 24 |
| for (i=0; i<number_of_objects; i++) { | |
|   object_data() | |
| } | |
| MODIFICATION DATA | |
| page_control() | |

The semantics of the fields included in the graphics page is as follows.

In the category "HEADER":

page_start_code indicates at how many bits per pixel the graphics page is to be displayed. For example the values 0x4734 and 0x4738 respectively indicate that display at 4 bits per pixel and display at 8 bits per pixel is intended.

page_data_length indicates the length of the graphics page in bytes duration specifies the length of the time interval during which the graphics page is to be displayed.

reserved1 and reserved2 leave space for future developments.

In the category "COLOR LOOKUP TABLE DATA":

clut_data_length indicates the number of color lookup table data bytes.

clut_element_Y, clut_element_Cr, clut_element_Cb and stuffing_byte respectively represent the luminance data for a CLUT entry, the Cr chrominance data for said CLUT entry, the Cb chrominance data for said CLUT entry and a stuffing byte, the latter for example having the value 0x00.

In the category "SHAPE DATA":

number_of_objects indicates the number of graphics objects which is included in the graphics page.

total_object_data length indicates the total number of bytes for all object data.

object data is described in more detail with reference to Table 2.

In the category "MODIFICATION DATA":

The modification data is in the form of one or more commands in a structure page_control.

The latter structure is described in more detail with reference to Table 6.

TABLE 2

Syntax of object_data

| Syntax | No. of bits |
|---|---|
| object_data_start_code | 16 |
| object_id | 8 |
| object_data_length | 24 |
| object_width | 10 |
| object_height | 10 |
| reserved | 2 |
| bpp | 2 |
| top_field_data_length | 16 |
| bottom_field_data_length | 16 |
| for (i=0; i<object_height; i++) { | |
|   line_of_pixel_data_for_top_field() | |
|   end_of_line_code | 8 |
| } | |
| for (i=0; i<object_height; i++) { | |
|   line_of_pixel_data_for_bottom_field() | |
|   end_of_line_code | 8 |
| } | |
| if(!wordaligned()) { | |
|   zero_byte | 8 |
| } | |

The following semantic definition applies to the fields shown in this table.

object_data_start_code has a predetermined value which indicates the beginning of the object_data.

object_id can be used to identify different objects within one graphics page.

object_data_length specifies the number of bytes in an object.

object_width indicates the number of pixels on each horizontal line of the graphics object.

object_height indicates the number of lines in each of the two fields composing the graphics object.

bpp defines the number of bits per pixel in the decoded graphics object. The number of bits is for example defined according to Table 3.

TABLE 3

Example of a definition of bpp.

| bpp | Meaning |
|---|---|
| '00' | reserved |
| '01' | 2 bits per pixel |
| '10' | 4 bits per pixel |
| '11' | 8 bits per pixel | top_field_data_length is an integer equal to the total number of bytes of all pixel data for the top field including the end_of_line_codes.

bottom_field_data_length is an integer equal to the total number of bytes of all pixel data for the bottom field including the end_of_line_codes.

end_of_line_code is a field containing a predetermined value to indicate the end of each line.

The fields line_of_pixel_data_for_bottom field( ) and line_of_pixel_data_for_top_field( ) may comprise one or more blocks of data corresponding to the syntax of line_of_pixel_data as described in Table 4.

TABLE 4

Syntax of line_of_pixel_data

| Syntax | No. of bits |
|---|---|
| data_type | 8 |
| if(data_type == 0x10){ | |
|   bpp2_code_block() | |
|   end_of_bpp2_code | 6 |
| } | |
| if(data_type == 0x11){ | |
|   bpp4_code_block() | |
|   end_of_bpp4_code | 8 |
| } | |
| if(data_type == 0x12){ | |
|   bpp8_code_block() | |
|   end_of_bpp8_code | 16 |
| } | |
| while(!bytealigned()){ | |
|   zero_bit | 1 |
| } | |

The following semantic definitions apply to the elements in the table:

data_type identifies the type of information in the code block immediately following this field. In the present embodiment the information may be identified according to Table 5.

TABLE 5 meaning of data_type.

| data_type | meaning |
|---|---|
| 0x10 | next field is a bpp2_code_block |
| 0x11 | next field is a bpp4_code_block |
| 0x12 | next field is a bpp8_code_block |
| others | reserved |

A bpp2_code_block( ) comprises runlength encoded data of one pixel or a sequence of pixels with color codes in the range from 0–3. An example of such a bpp2_code_block is the code as described in PHB 34241, which is incorporated by reference in the present description. The field end_of_bpp2_code has a predetermined content, for example six zero bits, to indicate the end of a bpp2_code_block. A bpp4_code_block( ) comprises runlength encoded data of one pixel or a sequence of pixels with color codes in the range from 0–15. The bpp4_code_block( ) can be defined in a form analogous to the bpp2_code_block( ) The field end_of_bpp4_code has predetermined content, for example eight zero bits, to indicate the end of a bpp4_code_block. A bpp8_code_block( ) comprises runlength encoded data of one pixel or a sequence of pixels with color codes in the range from 0–255. The bpp8_code_block( ) can be defined in a form analogous to the bpp2_code_block( ). The field end_of_bpp8_code has a predetermined content, for example sixteen zero bits, to indicate the end of a bpp8_code_block. In order to achieve that the field line_of_data comprises an integer number of bytes the field is completed with zero bits if necessary according to the instruction "while(!bytealigned( )) { zero_bit }".

In the following description the modification data defining additional visual properties of a graphics object are worked out in more detail. The modification data is stored at the record carrier in the form of commands in a structure referred to as "page_control".

The syntax of page control is described in Table 6.

TABLE 6

Syntax of page_control.

| Syntax | No. of bits |
| --- | --- |
| page_control_start_code | 16 |
| reserved | 8 |
| page_control_length | 24 |
| loop_count | 16 |
| while(processed_length<page_control_length){ | |
| relative_time_stamp | 32 |
| command_list() | |
| } | |

The semantics of the fields in the above table are described below.

page_control_start_code is a predefined value which indicates the start of page control information.

page_control_length is an unsigned integer which indicates the number of bytes in page_control( ) following this field.

With the field loop_count it can be specified how many times the execution of a sequence of commands is to be repeated. Preferably a zero value means that the command sequence is executed once.

The field relative_time_stamp enables a timing of the execution of the command_list( ) following this field.

The field command_list comprises one or more commands which define additional properties of a graphics object. The syntax of the field command_list is described in Table 7.

TABLE 7

Syntax of command_list.

| syntax | No. of bits |
| --- | --- |
| command_list_length | 16 |
| while(processed_length<command_list_length){ | |
| command() | |
| } | |

The semantics of the fields included in the table are as follows:

command_list_length is an unsigned integer indicating the number of bytes occupied by the commands following this field.

A commando determines a property of an object to display. The command has a first byte indicating the type of command and may have further bytes that form arguments of the command: An example is a command "page_load_clut" which assigns colors to the color codes. The syntax of this command is defined in the Table 8.

TABLE 8

Syntax of the command "page_load_clut".

| Syntax | No. of bits |
| --- | --- |
| command_code | 8 |
| clut_data_start_element | 24 |
| clut_start_entry | 8 |
| number_of_entries | 8 |

The semantics of this command is as follows:

command_code is a field identifying the command. This command is intended for loading data in a color lookuptable which assigns colors to the color codes. When this command is executed, a number of clut_elements equal to number_of_entries is loaded from the CLUT data comprised in the graphics page into the color lookup table. The data is loaded in ascending order. clut_data_start_element is the index of the first clut_ element in the CLUT data which is loaded. It is loaded into the entry of the color lookup table having index clut_start entry.

The record carrier further comprises a control program 4 for controlling playback of the video and/or graphics and or audio items.

Figure 2:
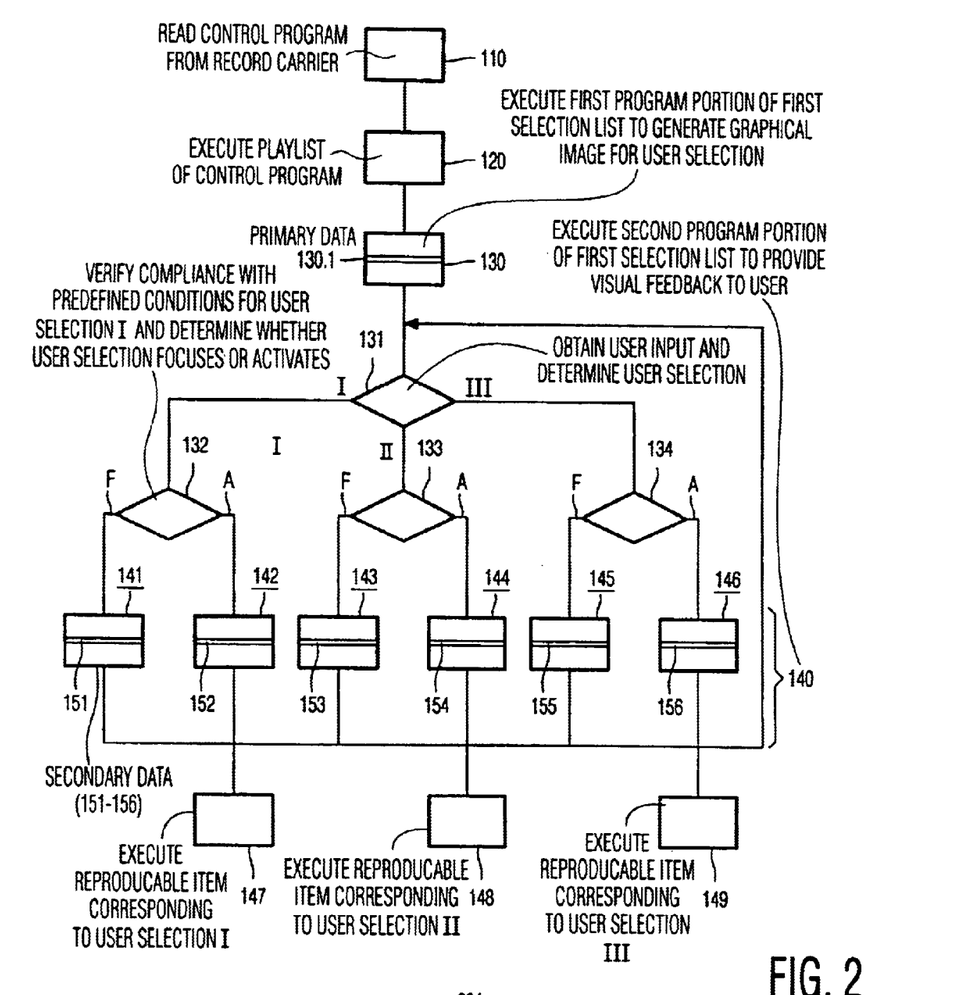
FIG. 2 shows a flowchart of the control program.

By way of example FIG. 2 shows a flowchart schematically showing a method for playing back a record carrier according to the invention. In a first program section 110 the control program 4 is read from the record carrier. The control program 4 for example has the form of a set of linked lists. The set comprises at least a first type of list, hereafter denoted as play list which defines a set of audio and/or video and/or graphics items that are playable in sequence. The set further comprises a second type of list, hereafter denoted as selection list which defines branching in the sequence of play items upon user control.

Figure 1A:
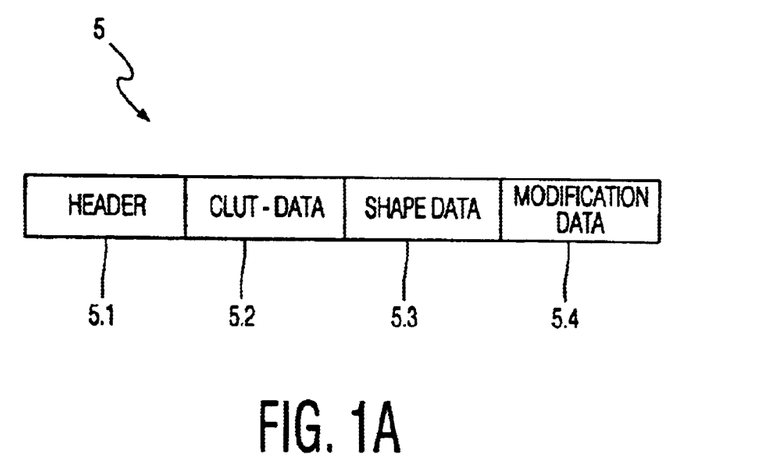
FIG. 1A schematically shows a datastructure stored at the record carrier.

In the present example the control program starts with a play list. Accordingly this playlist is executed in program section 120. This play list may for example show an overview of the contents of the record carrier. If execution of the playlist is finished or interrupted control is passed to a first selection list. The selection list has a first portion forming a first program portion and a second portion forming a second program portion. The first program portion executed in program section 130 comprises primary data 130.1 relating to shape properties of a graphics object. In this embodiment the primary data is a reference to a data structure 5. This datastructure, which is schematically shown in Figure 1A, comprises shape data 5.3, representing the shape properties of the graphics object. In the present example the data structure 5 also contains other data, i.e. header 5.1, color lookup table data 5.2 and modification data 5.4, required to make up a graphics page as is described with reference to Table 1. The data structure 5 and the control program 4 are stored in mutually non-overlapping data areas at the record carrier 1, so that the record carrier 1 can be easily loaded from the record carrier without loading the data structure 5. During execution of the first program portion 130 the datastructure 5 is read from the record carrier 1 and stored in a memory. By execution of the first program portion 130 a graphics image representing the one or more objects at the graphics page 5 is generated. The user is subsequently requested for input.

The selection list comprises a second portion 140, comprising program sections 141–146, forming a second program portion. The second portion 140 is to be executed after the first program portion 130 in case of compliance of user input with a predetermined condition specified in the program. The latter is verified in program sections 131, 132, 133 and 134. Program section 131 discriminates the selection I, II or III indicated by the user and program sections 132, 133 and 134 discriminates whether the user focusses (F) on or activates (A) a selection. The second program portion 140 having program sections 141–146 specifies a visual feedback in response to the user input. The second program portion 140 comprises secondary data (151–156). The secondary data comprises modification data which includes a reference to further data within the data structure 5. Here the further data comprise one or more color values in the CLUT data 5.2 in the data structure 5. More in particular the modification data is a command "pageload_clut" as described with reference to Table 8. The reference to the further data is formed by the entry "clut_data_start_element" mentioned in said table. In particular the second program portion comprises three groups of modification data, 151+152, 153+154 and 155+156 for each of three selections. Each group of modification data has a first subgroup 151, 153 and 155 and a second subgroup 152, 154 and 156. The first subgroup of modification data is to be assigned to the graphics object if the user focusses on the corresponding selection. The second subgroup is to be assigned to the graphics object if the user activates the corresponding selection. The modification data in each of the first and second subgroups differ from each other in that the page load_clut commands have mutually different values in the entry denoted by clut_data_start_element.

Figure 3:
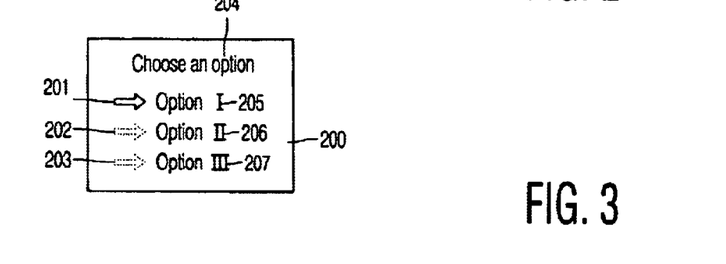
FIG. 3 shows an example of a form of visual feedback.

By activating a selection a reproducable item corresponding to that selection is executed in programsection 147, 148 or 149. By focussing on a selection it is not executed yet, but the user can indicate that this selection is to be executed if an activate command is given next. The second program portion 140 comprises a reference to a list (for example a play list) which is to be executed if the corresponding selection is activated. An example of an initial graphics image generated for said purpose is shown in FIG. 3. The shape data 5.3 in the datastructure 5 referred to by the primary data in the first program portion 130 of the control program comprises at least shape data of a graphics object comprising the following object parts: a first 201, a second 202 and a third arrow 203 and the wordings "Choose an option" 204. The graphics object in addition comprises the wordings: "option I" 205, "option II" 206 and "option III" 207. These wordings respectively correspond to the first I, second II and third selection III. The background, not belonging to the object, is indicated by reference numeral 200.

During processing of the first program portion 130 an intermediary pixel based representation is generated from the shape data 5.3 which is referred to by the primary data 130.1. In the intermediary pixel based representation each pixel is assigned a color code corresponding to one of the object parts (201–207) or to the background (200). The color code is represented by at least 6 bits, here 8 bits. Subsequently a pixel based representation is obtained by means of a color lookup table which assigns a color value representing a color to each of the color codes. The following table gives an example how the color codes are assigned to the background and the object parts, and how colors are assigned to the color codes.

| object part/background | color code | color |
|---|---|---|
| background | 0 | "blue" |
| "Choose an option" | 1 | "yellow" |
| "option I" | 2 | "green" |
| "option II" | 3 | "green" |
| "option III" | 4 | "green" |
| "arrow 1" | 5 | "red" |
| "arrow 2" | 6 | "blue" |
| "arrow 3" | 7 | "blue" |

The result of the above assignment of colors is that only the first 201 of the three arrows 201–203 is visible, so that it is clear to the user that initially the selection I referred to by "option I" is focussed upon. At the moment that the user provides input indicating that it is desired to focus upon another selection, for example by pointing with a pointing device, a second portion of the list is executed. If for example the user points at a rectangular area corresponding to the wordings "option II" a pixel based representation of the graphics object is reproduced on the basis of the primary data 130.1 and the relevant secondary data, here the modification data 153. In the present example the modification data 153 is in the form of a command 153 page_load_clut. Execution of this command has the effect that a set of color values is read from memory starting at a location indicated by clut_data_start_element and written in the color lookup table starting at a location clut_start entry. The number of color values written in the color lookup table is defined by number_of_entries. This has the effect that the color values corresponding to the colors "blue", "red", "blue" respectively are assigned to the color codes 5, 6 and 7 respectively. Now arrow 2 becomes visible and arrow I becomes invisible, so that it is clear to the user that now the second selection II is focussed upon. In the same way arrow 3 may be made visible, in order to focus upon the third selection III. If the user decides to activate a selection in order that the corresponding item is reproduced, the corresponding object part may be highlighted by assignment of further modification data in the second portion of the selection list, until said option is actually carried out. For example the wordings "option III" corresponding to the third selection III may be highlighted by assigning a color value corresponding to a bright shade of green to color pointer 4 in program section 146.

To give an even more notable feedback the secondary data in the second program portion 140 may contain page control information which comprises a first relative_time_stamp, a first command_list, a second relative time stamp and a second command_list. The first relative_time_stamp is set to a value corresponding to a time interval of 0 seconds, so that the first command_list is executed immediately after activation by the user. The first command_list for example again comprises a command which assigns the color value corresponding to said bright shade of green to color code 4. The second relative_time_stamp is corresponding to a time interval of for example 1 second. The second command_list comprises a command which assigns a color value corresponding to the color "green" again to the color code 4. This page_control information has the effect that the wordings "option III" blink. The commands may be repeated for a number of times which is specified by the field loop_count in the page_control information (See table 6). At the moment that the reproduction of the activated item starts, the display of the graphics page is interrupted.

The apparatus of the invention has already executed the first program portion, i.e. a first portion of the selection list when the user is prompted for input. After input of the user the apparatus only has to execute commands which assign additional visual properties to the graphics object the shape of which was already described in the shape data referred to by the primary data in the first portion of the list. It is not necessary to load the shape data again, so that the apparatus can give a fast feedback to the user input.

Figure 4:
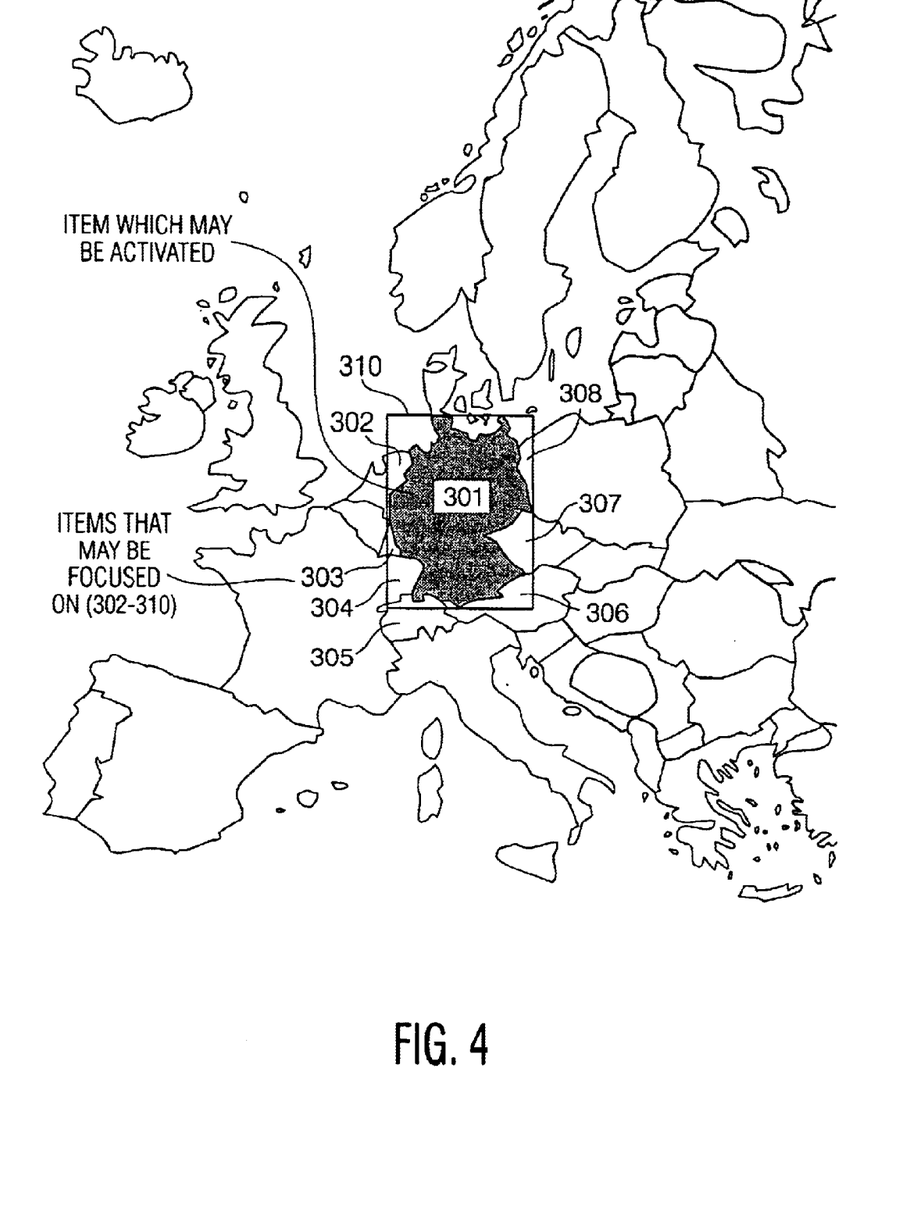
FIG. 4 shows a further example of visual feedback.

As a further example a record carrier of the invention may comprise travel information about a plurality of countries. For that purpose the record carrier comprises play items for each of those countries. Selection of those play items is enabled by a control program at the record carrier. The first portion of that control program comprises primary data in the form of a reference to shape data which is comprised in a complete graphics page. This graphics page, which is the form set out in Table 1, represents a map showing the plurality of countries e.g. countries 301–308 as illustrated in FIG. 4. Each of the object parts representing a country is assigned a unique color code and each color code is assigned an initial color value such that no two neighbouring countries are displayed with the same color. The color code is represented by at least 6 bits, here 8 bits. Subsequently the user is requested for input. By pointing at a location at the map, the user can focus on one of the countries. Upon this user input a second program portion of the control program comprising secondary data is executed so that a new pixel based representation of the graphics object is reproduced on the basis of the primary data and the secondary data. In the present example the secondary data is another set of color values which is to be assigned to the color codes. This has the effect that the object part 301 representing the country which is focussed upon is displayed with a different color, preferably a color not occurring elsewhere on the map.

In a method in accordance with the SVCD standard, the user input would be reflected by highlighting a rectangular region 310 containing the country 301. This would have the effect however that also neighbouring countries 302–308 are highlighted in so far as they are enclosed by that region 310. This is confusing to the user because it is not clear which country is focussed upon. Another disadvantage is that it is not possible to use a single color for highlighting, because that would entail that the boundaries between the country focussed upon and its neighbouring countries are not visible within the rectangular region 310.

Figure 5:
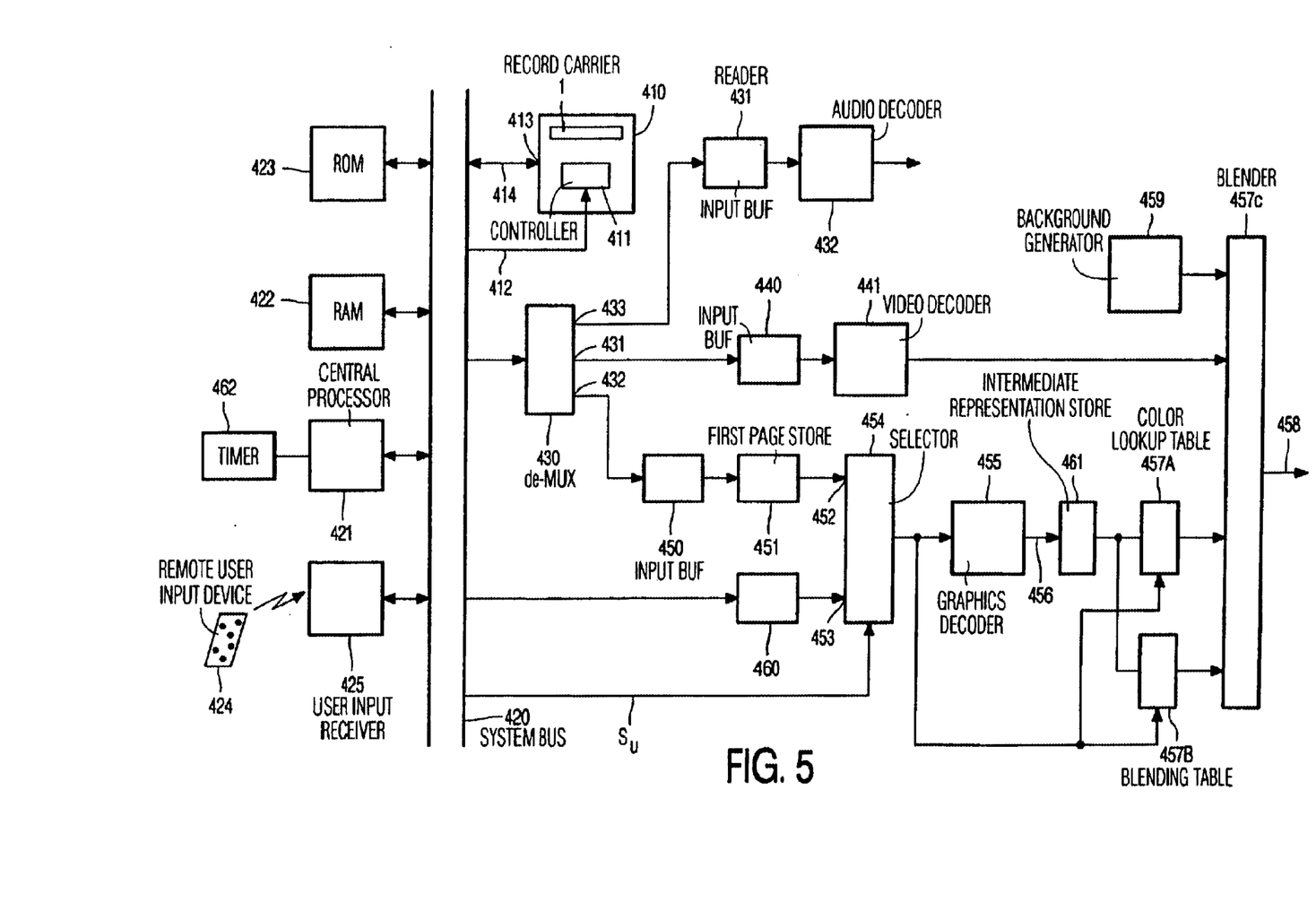

FIG. 5 diagrammatically shows an apparatus for playing back a record carrier as described with reference to FIG. 1. The apparatus comprises means 421, here in the form of a central processor, which are controllable by the control program. The apparatus further comprises read means 410. The read means 410 are provided with control means 411 to select data, for example a stream of data, at the record carrier upon instructions by address signals 412 from the central processor 421. The read means serve for reading the control program 4 and the selected stream from the record carrier 1. An output 413 of the read means 410 is coupled to a system bus 420 of a customary computer system for delivering the read information over a data signal path 414. Furthermore a central processor 421, a RAM 422, and a ROM 423 are connected to the system bus 420. The apparatus is provided with input means 424 and 425 for receiving user input.

The apparatus further has demultiplexing means 430 for receiving a data stream from the reading means 410 via the systembus 420. The demultiplexing means 430 demultiplex the data stream into a first stream, a second stream and a third stream which are contained in the datastream. A first output 431 of the demultiplexing means 430 is coupled to an input buffer 440 of video decoding means 441 for reproducing a pixel based representation 442 of the video item from the first stream. A second output 432 of said demultiplexing means 430 is coupled with an input buffer 450 of a first page store 451 for graphics decoding means. A third output 433 of the demultiplexing means 430 is coupled to an input buffer 431 of audio decoding means 432. The first page store 451 is intended for storing a graphics page. An output of said page store 451 is coupled to a first input 452 of selection means 454. An output of said selection means 454 is coupled with graphics decoding means 455 for generating an intermediary pixel based representation 456 from the shape data in the second stream. In the intermediate pixel based representation 456 each pixel is assigned a color code corresponding to an object part. An output of the graphics decoding means 455 is coupled to modification means 457A and 457B for generating a pixel based representation 458 from the intermediary pixel based representation 456 and the modification data. In the present embodiment the modification means comprise a color lookup table 457A which assigns a color to each color code generated by the graphics decoding means 455, a blending table 457B which assigns a blending factor to each color code and a blender 457C. The blender 457C generates a resulting pixel based representation 458 from the incoming signals, i.e. the signal 442 representing the pixel based representation of the video item and the pixel based representation generated by the modification means 457A and 457B and from a back drop signal generated by a background generator 459. The weighting factors for combining the signals recieved by the blender 457C are determined by the signal generated by the blending table 457B. The graphics decoding means 455, the color lookup table 457A, the color blending table 457B and the blender 457C form graphics generating means.

The apparatus is adapted for executing a first program portion 130 of the control program 4 which comprises at least primary data relating to shape properties of a graphics object. The apparatus further is adapted for executing a test 131–134 for compliance of user input with a condition specified in the control program 4 and for executing a second program portion 140 of the control program 4 for giving visual feedback in response to the user input.

The apparatus of the invention is characterised in that it is adapted for executing a control program 4 in which the second program portion 140 comprises secondary data 151–156 which relates to an additional visual property of the graphics object. The apparatus of the invention is further adapted for generating the visual feedback by reproducing a pixel based representation 458 of the graphics object on the basis of the primary data 130.1 and the secondary data 151–156. To that end the apparatus comprises a second page store 460 for storing a graphics page 5 comprising shape data 5.3 and modification data 5.4 of the graphics object. An input of said second page store 460 is coupled to the system bus 420, so that the central processing unit 421, when processing a control program 4, can load the data structure 5 comprising the shape data 5.3 and the modification data 5.4 into the second page store 460. During processing of the first program portion 130 of the control program 4, the apparatus loads the datastructure comprising the shape data 5 from a location at the record carrier 1 referred to by the primary data 130.1. An output of the second page store 460 is coupled to a second input 453 of the selection means 454. In the embodiment of FIG. 5 the graphics decoding means 455, here in the form of a run length decoder, generate the intermediary pixel based representation 456 on the basis of the primary data in the control program 4. The graphics modification means 457A, 457B, 457C generate the pixel based representation 458 from the intermediary pixel based representation 456 on the basis of the secondary data in the control program 4. Here the secondary data is modification data comprised in the control program 4. The apparatus has storage means 461 for storing an intermediate representation 456 of a graphics object, so that it is not necessary to recompute the intermediate representation 456 each time that new modification data are loaded into the second page store 460. The amount of hardware can be limited because the graphics generating means 455, 457A, 457B, 457C are both used to generate a pixel based representation 458 of the graphics items in the second stream 3 delivered by the second output 432 of the demultiplexer 430 and of the graphics objects referred to by the control program 4. In order to achieve that either a graphics image is reproduced from the second stream 3 or from the graphics object referred to by the control program 4, the selection means 454 select one of the signals received at the first and the second input 452, 453 thereof. The selection is determined by a control signal Sw sent by the CPU 421 to the selection means 454 via the system bus 420. The apparatus is adapted for executing timing commands in the control program. To that end the apparatus comprises timing means 462.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims:

What is claimed is:

1. Apparatus comprising:
   means for reading a control program from a record carrier,
   means for selecting a stream of data to be read from the record carrier, which means are controllable by the control program;
   reading means for reading the selected stream from the record carrier;
   video generating means for generating a pixel based representation of the video item in the first stream;
   graphics generating means for generating a pixel based representation of the graphics item in the second stream;
   input means for receiving user input;
   means for executing a first program portion of the control program that includes at least primary data relating to shape properties of a graphics object, for executing a test for compliance of user input with a condition specified in the control program and for executing a second program portion of the control program for giving visual feedback in response to the user input, the second program portion of the control program includes secondary data which relates to an additional visual property of the graphics object; and
   means for generating the visual feedback by reproducing a pixel based representation of the graphics object depending on the primary data and the secondary data.

2. The apparatus of claim 1, in which the graphics object includes two or more parts having mutually different color codes, and the secondary data relates to at least one color value which is to be assigned to a color code.

3. The apparatus of claim 2, in which the color code is represented by at least 6 bits.

4. The apparatus of claim 1, in which the primary data is related to the shape properties and the primary data includes a reference to a data structure including shape data representing the shape properties.

5. The apparatus of claim 4, in which the datastructure includes further data and the secondary data is related to the additional visual property and the secondary data includes modification data which includes a reference indicating the location of the further data within the datastructure, the modification data and the further data representing the additional visual property.

6. The apparatus of claim 5, in which the further data includes one or more color values.

7. The apparatus of claim 1, in which the graphics generating means also generate the pixel based representation of the graphics object.

8. The apparatus of claim 1, in which the apparatus is adapted for executing timing commands in the control program.

9. The apparatus of claim 1, in which the graphics generating means include graphics decoding means for generating an intermediate pixel based representation, storage means for storing the intermediary pixel based representation and graphics modification means for generating a pixel based representation from the intermediary pixel based representation depending on the modification data.

10. The apparatus of claim 1, in which the graphics decoding means include a runlength decoder.

11. A method comprising the steps of:
    reading a control program having a first and second program portion from a record carriers
    executing the first program portion including primary data relating to shape properties of a graphics object
    requesting user input;
    performing a test in the program for compliance of the user input with a condition;
    upon compliance of the user input with the condition, executing the second program portion for giving visual feedback to the user input;
    selecting a stream of data representing a video item and/or a graphics item, the selection depending on the user input;
    reading the stream from the record carrier and generating a pixel based representation from the item in the stream;
    and in which:
    the second program portion includes secondary data relating to at least one additional visual property of the graphics object, and
    the visual feedback is a representation of the graphics object depending on the primary and the secondary data.

12. The method of claim 11, in which the graphics object includes two or more parts having mutually different color codes, and the secondary data relates to at least one color value which is to be assigned to a color code.

13. The method of claim 12, in which the color code is represented by at least 6 bits.

14. The method of claim 11, in which a data structure including shape data representing shape properties of the graphics object is read from a location at the record carrier which is referred to by the primary data before the step of requesting user input.

15. The method of claim 14, in which the datastructure includes further data, and the secondary data is related to the additional visual property and the secondary data includes modification data which includes a reference indicating the location of the further data within the datastructure, the datastructure being stored in a memory before user input is requested, and the further data being retrieved from a location in the memory indicated by the reference in the secondary data after user input has been received.

16. The method of claim 15, in which the further data includes one or more color values.

17. A record carrier comprising:
- a first stream of data representing a video item
- a second stream of data representing a graphics item;
- a control program for controlling interactive playback of the items, which program has a first program portion which includes primary data, relating to shape properties of a graphics object and a second program portion which is to be executed after the first program portion when user input complies with a predetermined condition specified in the program, which second program portion specifies a visual feedback in response to the user input, the second program portion includes secondary data, relating to at least an additional visual property of the graphics object.

18. The carrier of claim 17, in which the graphics object includes two or more parts having mutually different color codes, and the secondary data relates to at least one color value which is to be assigned to a color code.

19. The carrier of claim 17, in which the color code is represented by at least 6 bits.

20. The carrier of claim 17, in which the primary data is related to the shape properties and includes a reference to a data structure including shape data representing the shape properties.

21. The record carrier of claim 20, in which the datastructure includes further data and the secondary data is related to the additional visual property and the secondary data includes modification data which includes a reference indicating the location of the further data within the datastructure, the modification data and the further data representing the additional visual property.

22. The carrier of claim 21, in which the further data includes one or more color values.

23. The carrier of claim 17, in which the data in the second stream and the data related to the graphics object are in a form which can be processed by common graphics generating means.

24. The carrier of claim 17, in which the shape properties of the graphics object are represented in the form of run-length encoded data.

25. A method comprising the steps of:
- storing a first stream of data representing a video item, on a record carrier;
- storing a second stream of data representing a graphics item, on the record carrier;
- storing a control program for controlling interactive playback of the items on the record carrier, which program has a first program portion which includes primary data, relating to shape properties of a graphics object and a second program portion which is to be executed after the first program portion when user input complies with a predetermined condition specified in the program, which second program portion specifies a visual feedback in response to the user input, the second program portion includes secondary data, relating to at least an additional visual property of the graphics object.

* * * * *